Figure 2:
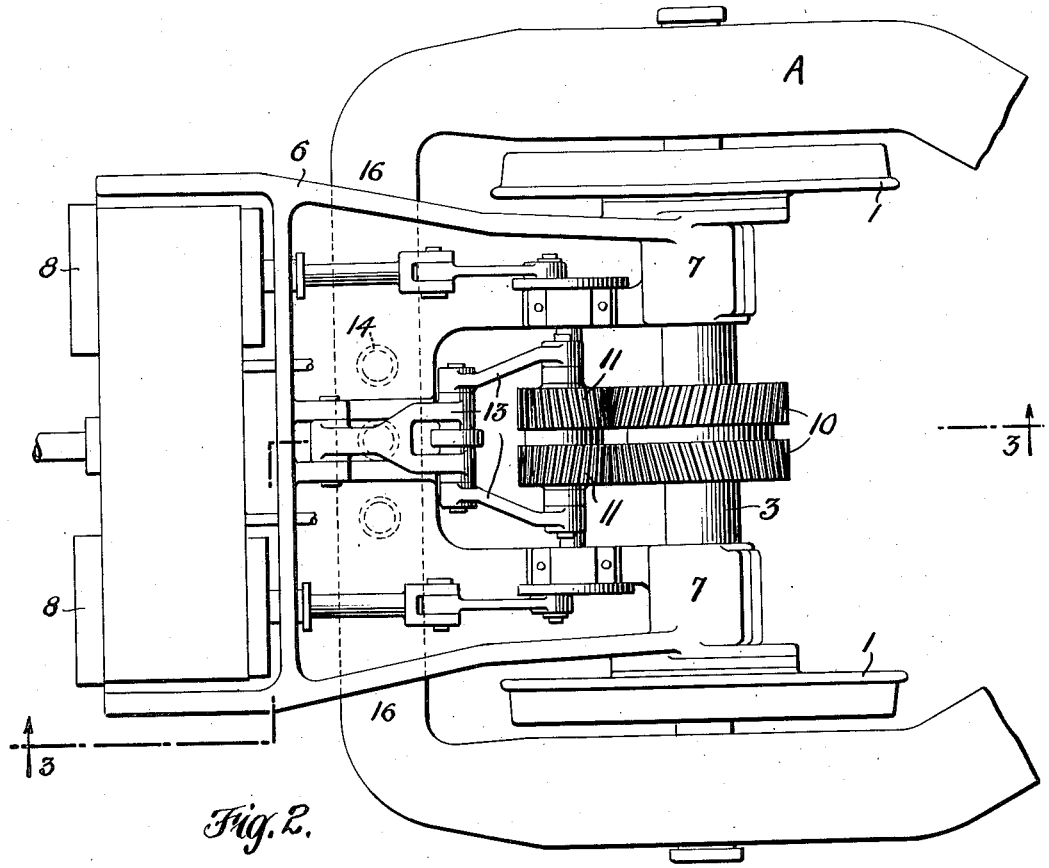

Oct. 16, 1923.
F. R. PETERS
1,470,760
MOUNTING FOR LOCOMOTIVE BOOSTER MOTORS
Original Filed Dec. 8, 1921    3 Sheets-Sheet 1
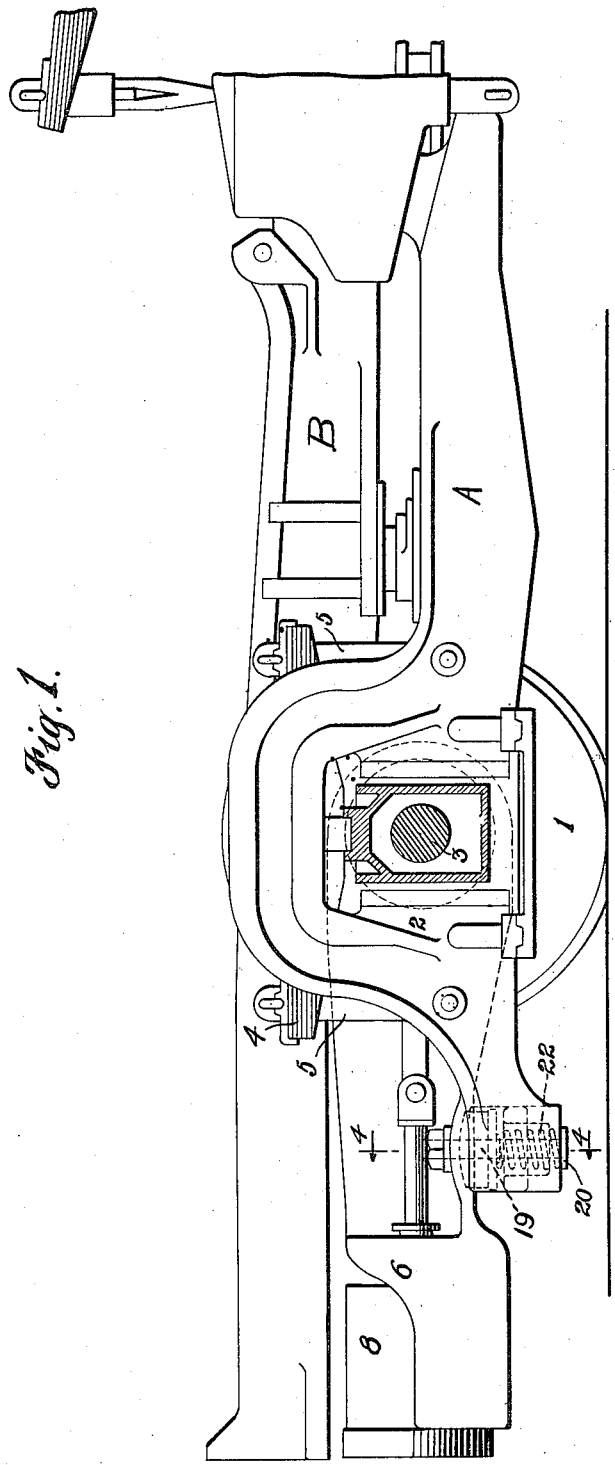
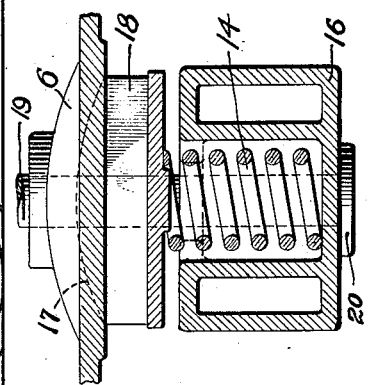
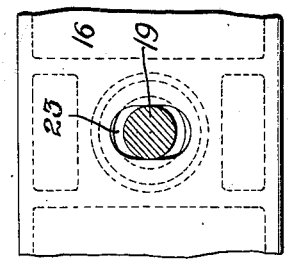
INVENTOR.
Frank R. Peters
BY
Synnestvedt & Lechner
ATTORNEYS INVENTOR.
Frank R. Peters
BY Synnestvedt & Lechner
ATTORNEYS.

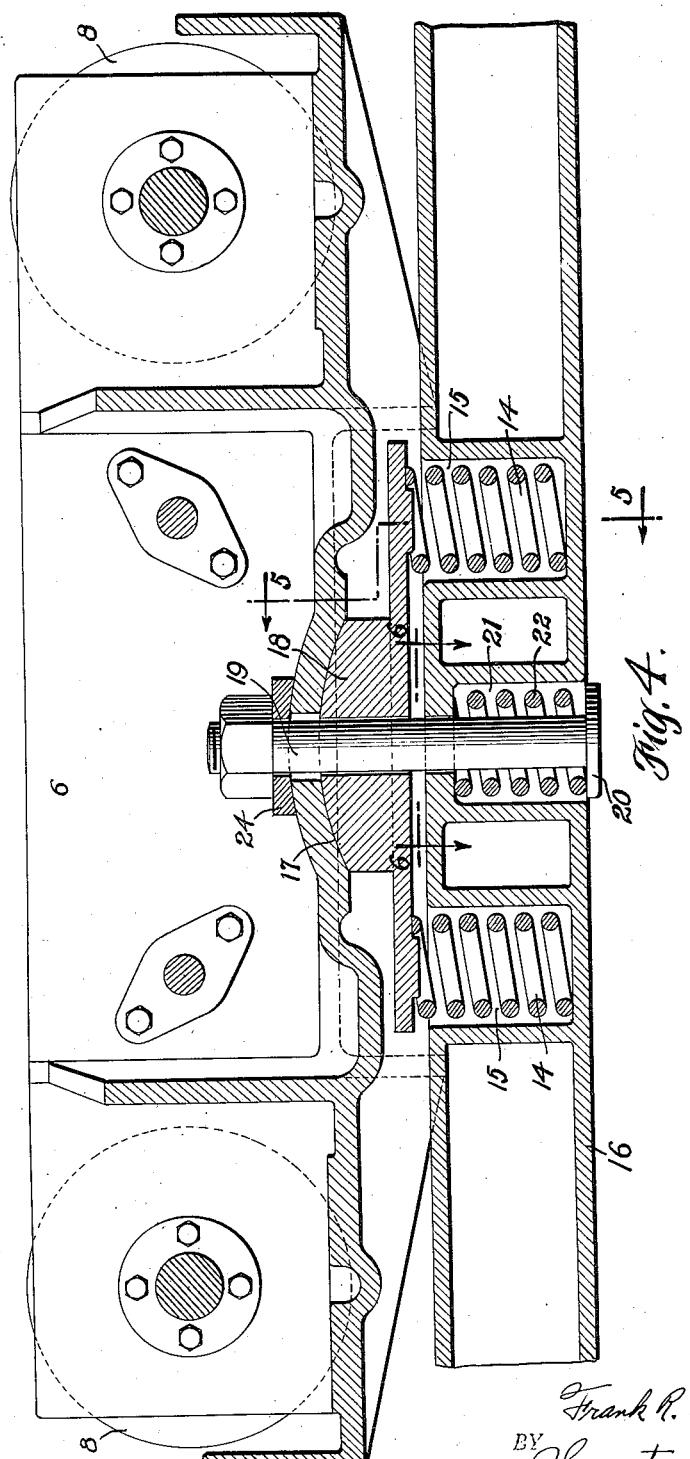

Patented Oct. 16, 1923.

1,470,760

UNITED STATES PATENT OFFICE.

FRANK R. PETERS, OF NEW YORK, N. Y., ASSIGNOR TO FRANKLIN RAILWAY SUPPLY COMPANY, A CORPORATION OF DELAWARE.

MOUNTING FOR LOCOMOTIVE BOOSTER MOTORS.

Application filed December 8, 1921, Serial No. 520,822. Renewed March 20, 1923.

*To all whom it may concern:*

Be it known that I, FRANK RICHARD PETERS, a subject of the King of Great Britain, residing at New York city, in the county of New York and State of New York, have invented certain new and useful Improvements in Mountings for Locomotive Booster Motors, of which the following is a specification.

This invention relates to booster motors for locomotives which are ordinarily intended to aid the locomotive only in starting or in propelling it at slow speeds. They are designed to drive weight supporting axles and wheels which otherwise would be normally idle. The invention might be applied to such axles or wheels either on the locomotive or on the tender a good example being illustrated in the patent to Howard L. Ingersoll No. 1,375,293.

The particular object of the invention is to provide an improved mounting for the booster motor at the point where it is supported upon the truck frame. Such a mounting is well illustrated and described in patent to H. M. Pflager No. 1,357,928, issued on November 2, 1920 and my invention is in the nature of an improvement over the structure therein illustrated.

More specifically stated my invention contemplates the provision of a mounting between the booster motor bed plate and the truck frame which will secure a firm and rigid seat for the booster motor during periods of its operation, which at the same time will permit slight rocking and sliding movements of the booster motor bed plate with respect to the truck frame and one which will, in addition to the foregoing, resiliently or yieldingly support the booster motor during times when it is inoperative.

My invention although by no means necessarily limited to such an application is particularly useful in cases where the booster motor is applied to a trailer truck which is not spring borne.

Further objects of the invention are the prevention of the transmission of excessive vibration to the locomotive when travelling at high speed with the booster motor inoperative and the provision of a construction which will utilize the torque exerted by the booster motor when operating to seat it firmly upon the truck frame as above indicated whereby a rigid bearing is secured against which the booster engine may work. These together with such other objects as are incident to my invention and which may appear hereinafter I obtain by means of the construction illustrated in the accompanying drawings, wherein—

Figure 3:
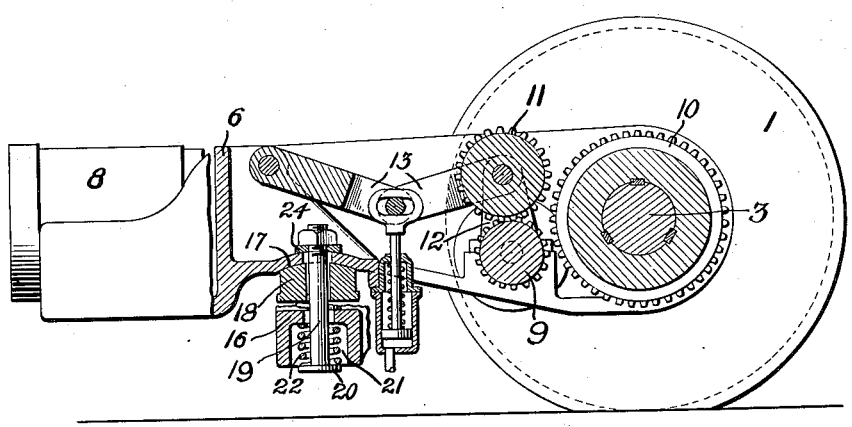

Figure 1 is a side elevation of a portion of the rear end of a locomotive provided with a swinging trailer truck illustating the general application of my invention; Figure 2 is a plan view, with certain parts omitted for purposes of clearness, of the booster engine and the rear portion of a trailer truck showing the general manner in which the wheels of the trailer truck are driven by the booster motor; Figure 3 is a section on the line 3—3 of Figure 2; Figure 4 is a section on a greatly enlarged scale taken on the line 4—4 of Figure 1 which illustrates in more or less detail the principal features of my improvement; Figure 5 is a section on the line 5—5 of Figure 4 illustrating a detail of the invention; and Figure 6 is a section on the line 6—6 of Figure 4 illustrating still another detail of the invention.

The trailer truck construction illustrated in the drawings is of a standard and well known character and need not be described in detail. Suffice it to say that the frame A is pivoted at its forward end to the main frame B of the locomotive. It is provided with a pair of wheels 1 mounted for vertical play in the jaws 2 in association with the axle 3 upon which the wheels are mounted. In some trailer trucks the weight is transmitted to the axle 3 through the medium of springs 4 and hangers 5 while in others the springs are omitted. Figure 1 discloses a truck in which a spring is utilized, while Figure 2 discloses a modification in which a spring is not utilized.

The booster motor is supported upon a suitable frame or bed plate casting 6 provided with spaced bearings 7 at its forward end which embrace the axle 3. The booster bed plate therefore partakes of the motion of the trailer wheels and their axle and the rear end can move slightly upwardly and downwardly on the axle as a pivot. It is advisable to provide some means of support between the booster bed plate and the trailer truck frame, but as will be clear such support must necessarily be capable of adapting itself to the slight movements just pointed out above. It is with this support that my invention is particularly concerned. But before a description of this support is given, it is necessary to understand the manner in which the booster motor drives the trailer truck wheels 1.

The cylinders 8 of the booster motor drive the pinion 9 through the medium of any suitable connection which is only partially shown but which need not be particularly described inasmuch as it forms no part of the present invention. The axle 3 carries the large driving gears 10 and when it is desired to connect the booster motor to the axle the gears 11 are moved on the rocking arms 12 into mesh with the gears 10 through the medium of a toggle mechanism 13, it being understood, of course, that the gears 11 are constantly in mesh with the driving pinion 9. The foregoing structure is clearly illustrated and described in Mr. Ingersoll's issued United States Patent No. 1,339,395.

The rear end of the booster motor bed plate 6 is normally supported upon springs 14 carried in pockets 15 (see Figure 4) formed in the lower transverse portion 16 of the trailer truck frame A. These springs normally carry the booster motor bed plate and therefore the booster is free of the portion 16 of the frame A when the booster motor is not operating.

Interposed between the springs 14 and the concave under bearing surface 17 of the bed plate 6 is a bearing member or plate 18 having a rounded upper surface fitting into the surface 17 as clearly shown in the drawings. A king bolt 19 passes through all these members and carries at its lower end an enlarged head 20 between which and the bottom of a pocket 21 formed in the under face of the transverse member 16 is interposed a spring 22. The spring 22 absorbs the shock of upward movement of the booster motor bed plate.

When the power of the booster motor is applied to the axle the torque created compresses the springs 14 and brings the member 18 to a firm seat upon the transverse member 16 of the trailer truck A thereby giving the booster cylinders a firm and rigid support against which to work during operation. As soon, however, as the booster motor is thrown out of operation it is desirable to have it resiliently or yieldingly supported at its rear end which is automatically accomplished by means of the springs 14. Without this arrangement excessive vibration would be transmitted to the engine when the locomotive was travelling at high speeds with the booster motor inoperative which would result in severe strains on both the truck and the engine.

During running of the locomotive there is a constant movement or play of the booster motor bed plate which, when the member 18 is seated against the portion 16, is taken care of by the rounded bearing between the underface of the bed plate and the upper face of the member 18.

In order to accommodate the slight up and down movement of the rear end of the bed plate it is essential that the king bolt 19 have a more or less loose fit in the transverse member 16 of the trailer truck frame A. To this end I provide an elongated opening or slot 23 shown in Figure 6. The king bolt also preferably has a more or less loose fit in the member 18 as well as in the bed plate 6 and the washer 24.

I claim:

1. A mounting for locomotive booster motors comprising in combination with the axle and the frame of a truck, a bearing plate between the booster motor and the truck frame, a rounded seat for the booster motor on said plate, and yielding supporting means between the plate and the truck frame.

2. A mounting for locomotive booster motors comprising in combination with the axle and the frame of a truck, a bearing plate between the booster motor and the truck frame, a rounded seat for the booster motor on said plate, and yielding supporting means between the plate and the truck frame, said plate being adapted to be seated against the frame when the booster is operating whereby to provide a firm support for the motor to work against.

3. The combination with the axle and the frame of a truck, of a booster motor for the locomotive, a frame for the booster motor, said motor frame having a fixed support on the axle and a yielding support on the truck frame, and a rocking seat for the motor frame on said yielding support.

4. A mounting for locomotive booster motors comprising in combination with the axle and the frame of the truck to which it is applied, a fixed support on the axle, a yielding support on the truck frame, and a rocking seat for the motor on said yielding support.

In testimony whereof I have hereunto signed my name.

FRANK R. PETERS.